United States Patent
Richard (10) Patent No.: US 10,872,429 B2
(45) Date of Patent: Dec. 22, 2020

(54) METHOD FOR CHARACTERISING THE ANISOTROPY OF THE TEXTURE OF A DIGITAL IMAGE

(71) Applicants: UNIVERSITÉ D'AIX-MARSEILLE, Marseilles (FR); CENTRE NATIONAL DE LA RECHERCHE SCIENTIFIQUE, Paris (FR)

(72) Inventor: Frédéric Richard, Marseilles (FR)

(73) Assignees: UNIVERSITÉ D'AIX-MARSEILLE, Marseilles (FR); Centre National de la Recherche Scientifique, Paris (FR)

( * ) Notice: Subject to any disclaimer, the term of this patent is extended or adjusted under 35 U.S.C. 154(b) by 34 days.

(21) Appl. No.: 16/463,573

(22) PCT Filed: Nov. 23, 2017

(86) PCT No.: PCT/FR2017/053241
§ 371 (c)(1),
(2) Date: May 23, 2019

(87) PCT Pub. No.: WO2018/096288
PCT Pub. Date: May 31, 2018

(65) Prior Publication Data
US 2019/0325591 A1    Oct. 24, 2019

(30) Foreign Application Priority Data

Nov. 24, 2016 (FR) ..................................... 16 61425

(51) Int. Cl.
*G06T 7/42* (2017.01)
*G06T 7/44* (2017.01)
(Continued)

(52) U.S. Cl.
CPC .................. *G06T 7/42* (2017.01); *G06T 7/44* (2017.01); *G06T 7/45* (2017.01); *G06T 7/46* (2017.01);
(Continued)

(58) Field of Classification Search
CPC .... G06T 7/42; G06T 7/44; G06T 7/45; G06T 7/46; G06T 7/90; G06T 7/0012;
(Continued)

(56) References Cited

U.S. PATENT DOCUMENTS 6,647,132 B1   11/2003 Montillo et al.
6,766,054 B1   7/2004 Christensen et al.
(Continued)

FOREIGN PATENT DOCUMENTS

CN   101216435 A   7/2008
CN   101976441     2/2011
(Continued)

OTHER PUBLICATIONS

Statistical Tests of Anisotropy for Fractional Brownian Textures. Application to Full-field Digital Mammography (Year: 2009).*

*Primary Examiner* — Nizar N Sivji
(74) *Attorney, Agent, or Firm* — Occhiuti & Rohlicek LLP (57) ABSTRACT

This characterizing method comprises:
estimating (28) the scalar coefficients $\tau_m$ of an even function $\tau(\theta)$ defined in $[0; 2\pi]$ that minimizes the following criterion C:
(Continued)

$$C = \sum_{j=1}^{n_j} (\beta_j - \tau * \Gamma(\alpha_j))^2$$

where:

$\beta_j$ are terms estimated from an acquired digital image,
$\tau(\theta)$ is a $\pi$-periodic function defined in the interval $[0; 2\pi]$,
$\Gamma(\theta)$ is the function defined by the following relationship:

$$\Gamma(\theta) = \int_{\mathbb{R}_+} |\hat{v}(\rho\theta)|^2 \rho^{-2H-1} d\rho$$

where:
  $\hat{V}$ is the discrete Fourier transform of a convolution kernel v,
  H is an estimated Hurst exponent of the acquired image,
f) then, calculating (30), depending on the estimate of the scalar coefficients $\tau_m$, an anisotropy index that characterizes the anisotropy of the image, this index varying monotonically as a function of the statistical dispersion of the values of the function $\tau(\theta)$ for $\theta$ varying between 0 and $\pi$.

11 Claims, 2 Drawing Sheets

(51) Int. Cl.
| | | |
|---|---|---|
| *G06T 7/45* | (2017.01) | |
| *G06T 7/46* | (2017.01) | |
| *G06T 7/90* | (2017.01) | |
| *G06K 9/52* | (2006.01) | |
| *G06T 7/00* | (2017.01) | |

(52) U.S. Cl.
CPC ............ *G06T 7/90* (2017.01); *G06K 9/527* (2013.01); *G06T 7/0012* (2013.01); *G06T 2207/20056* (2013.01); *G06T 2207/30068* (2013.01)

(58) Field of Classification Search
CPC . G06T 2207/20056; G06T 2207/30068; G06T 15/04; G06T 11/001; G06T 15/005; G06T 1/60; G06K 9/527; G09G 5/363
See application file for complete search history.

(56) References Cited

U.S. PATENT DOCUMENTS

| | | | |
|---|---|---|---|
| 10,089,748 B2* | 10/2018 | Richard | .................... G06T 7/30 |
| 2005/0207650 A1* | 9/2005 | Martin | ................. G06K 9/4647 |
| | | | 382/190 |
| 2007/0213942 A1 | 9/2007 | Ponson et al. | |
| 2009/0285462 A1 | 11/2009 | Darbycz et al. | |
| 2015/0049170 A1* | 2/2015 | Kapadia | ............... H04N 5/2621 |
| | | | 348/46 |
| 2017/0261414 A1 | 9/2017 | Vernede et al. | |
| 2017/0294025 A1 | 10/2017 | Richard | |

FOREIGN PATENT DOCUMENTS

| | | |
|---|---|---|
| CN | 101976442 | 2/2011 |
| CN | 101996322 | 3/2011 |
| CN | 101996323 | 3/2015 |
| CN | 10587903 | 7/2016 |
| TW | 201525728 | 7/2015 |
| WO | WO 2007/048934 | 5/2007 |
| WO | WO 2009/137936 | 11/2009 |
| WO | WO2016/042269 | 3/2016 |
| WO | WO 2016/050871 | 4/2016 |
| WO | WO 2018/102184 | 6/2018 |

OTHER PUBLICATIONS

Frédéric J.P. Richard, "Some anisotropy indices for the characterization of Brownian textures and their application to breast images," Spatial Statistics, vol. 18, pp. 147-162, Feb. 17, 2016.

Frédéric J.P. Richard, "Analysis of Anisotropic Brownian Textures and Applications to Lesion Detection in Mammograms," Procedia Environmental Sciences, vol. 27, pp. 16-20, Aug. 14, 2015.

Frédéric J.P. Richard, "Tests of isotropy for rough textures of trended images," Statistica Sinica, vol. 26, No. 3, pp. 1-32, Jul. 1, 2016.

Steve Davies and Peter Hall, "Fractal Analysis of Surface Roughness by Using Special Data," Journal of Royal Statistical Society, Series B (Statistical Methodology), vol. 61, No. 1, pp. 3-37 (1999).

Frédéric J.P. Richard, Anisotropy Indices for the Characterization of Brownia Textures and their Application to Breast Images, Aix Marseille Université, CNRS, Centrale Marseille I2M, UMR 7373, 13458 Marseille, France, Dec. 2, 2015 (28 pages).

* cited by examiner

METHOD FOR CHARACTERISING THE ANISOTROPY OF THE TEXTURE OF A DIGITAL IMAGE

CROSS REFERENCE TO RELATED APPLICATIONS

This application is a National Stage of International Application No. PCT/FR2017/053241 filed on Nov. 23, 2017, which claims priority to French Application No. 1661425 filed on Nov. 24, 2016, the contents of which are hereby incorporated by reference in their entirety.

The invention relates to a method for characterizing the anisotropy of the texture of a digital image. The invention also relates to a method for classifying digital images depending on the anisotropy of their texture. The invention lastly relates to a data storage medium and to a computer for implementing these methods.

Patent application WO2016/042269A1 describes a method that allows the Hurst exponent H of the texture of an image and terms $\beta_j$ that vary depending on the characteristics of the texture of this image in one particular direction corresponding to an angle $\alpha_j$ to be estimated. This method is very good at identifying the anisotropy of an image.

It has also been proposed to construct an index A that characterizes the anisotropy of the texture of the image from the terms $\beta_i$. This index is called the "anisotropy index". For example, the calculation of an anisotropy index A from the terms $\beta_i$ is described in the following articles:

F. J. P Richard: "Analysis of anisotropic brownian textures and application to lesion detection in mammograms", Procedia Environmental Sciences 27 (2015) 16-20, 2015, F. J. P Richard: "Anisotropy indices for the characterization of brownian textures and their application for breast images", 2016

F. J. P Richard: "Some anisotropy indices for the characterization of Brownian texture and their application to breast images", SPATIAL STATISTICS, vol. 18, Feb. 17, 2016, pages 147-162, F. J. P Richard: "Tests of isotropy for rough textures of trended images", STATISTICA SINICA, vol. 26, no 3, Jul. 1, 2016, pages 1-32.

In these articles, the index A is dependent on the average of the terms $\beta_j$. For a given angle $\alpha_j$, the term $\beta_j$ varies as a function of characteristics of the texture in this given direction but also as a function of the Hurst exponent H. It will be recalled that the Hurst exponent H is a global characteristic of the texture that is independent of the orientation of the image. Thus, when a variation in the term $\beta_j$ is observed, it is not possible to know simply whether this variation is due to a modification of the anisotropy of the image or to a modification of the texture in its entirety and therefore of the Hurst exponent H. Thus, this index A varies not only as a function of the anisotropy of the texture of the image but also as a function of the Hurst exponent H of the texture of this image.

The invention aims to provide a method for characterizing the anisotropy of an image using an anisotropy index that varies as a function of the anisotropy of the texture while being much less sensitive to variations in the Hurst exponent H of the same texture. One subject thereof is therefore a method as claimed in claim 1.

The claimed method estimates from the terms $\beta_j$, the coefficients of a function $\tau(\theta)$, here referred to as the asymptotic topothesia function. This function $\tau(\theta)$ has the particularity of returning a value that characterizes the texture of the image in the direction $\theta$ while being almost completely independent of the value of the Hurst exponent H associated with the same texture. Thus, constructing the anisotropy index, which varies monotonically as a function of the statistical dispersion of the function $\tau(\theta)$, in this way allows an index that varies as a function of the anisotropy of the texture while being practically independent of the value of the Hurst exponent H of the same texture, to be obtained.

Embodiments of this method may have one or more of the features of the dependent claims.

These embodiments of the characterizing method furthermore have the following advantages:

The calculation of the estimates of the scalar coefficients of the function $\tau(\theta)$ by virtue of a linear relationship between these coefficients to be estimated and the terms $\beta_j$ accelerates very substantially the execution of the characterizing method.

The fact that the optimal value of the parameter $\lambda$ is calculated allows the estimation of the scalar coefficients of the function $\tau(\theta)$ to be improved and therefore an index that is even less sensitive with respect to variations in the Hurst index H to be obtained.

Another subject of the invention is a method for automatically classifying digital images depending on the anisotropy of their texture.

The invention also relates to a data storage medium, containing instructions for implementing the claimed method, when these instructions are executed by a computer.

The invention also relates to a computer for implementing the claimed method.

The invention will be better understood on reading the following description, which is given merely by way of nonlimiting example with reference to the appended drawings, in which.

In these figures, the same references have been used to reference elements that are the same. In the rest of this description, features and functions well known to those skilled in the art have not been described in detail.

In this description, the following mathematical notations and conventions have been adopted, unless otherwise indicated:

the interval [X, Y] is the interval of all the integer numbers higher than or equal to X and lower than or equal to Y, where X and Y are themselves integers;

a vector A in a space of d dimensions (such that $\mathbb{N}^d$) has for coordinates $A_1, A_2, \ldots, A_d$;

$[0, X]^d$ is the product $[0,X_1] \times [0,X_2] \times \ldots \times [0,X_d]$ where X is a vector of $\mathbb{N}^d$ of coordinates $X_1, X_2, \ldots, X_d$, such that the i-th coordinate $U_i$ of a vector U of $[0, X]^d$ belongs to the interval $[0,X_i]$, where i is an index higher than or equal to 0 and lower than or equal to d;

$|X|$ is the sum of the components of the vector X, such that $|X|=|X_1|+|X_2|+\ldots+|X_d|$;

|X|² is the Euclidean norm to the power of two of the vector X, such that $|X|^2=(X_1^2+X_2^2+ \ldots +X_d^2)$.

Figure 1A:
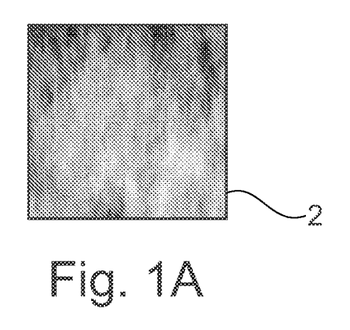
FIGS. 1A to 1D are schematic illustrations of digital images having isotropic and anisotropic textures.

FIG. 1A shows a digital image 2 the texture of which has anisotropy.

In this description, anisotropy is understood to mean the fact that the properties of the texture of the image differ depending on the direction in which they are observed.

The texture of a digital image is generally defined relative to the spatial distribution of variations in the intensity and/or variations in the tone of the pixels forming the digital image. Texture is a manifestation of the Hölderian regularity of the image. The notion of texture is for example defined:
  in the work "Handbook of Texture Analysis", M. Mirmehdi et al., eds., World Scientific, October 2008 in the chapter "Introduction to Texture Analysis" by E. R. Davies, or even:
  in section "I. Introduction" of the article by Robert M. Haralick et al; "Textural features for image classification"; IEEE Transactions on Systems, Man and Cybernetics; vol. SMC-3, no 6, p. 610-621, November 1973.

The anisotropy of an image may be caused by two factors: texture and "tendency". Typically, texture corresponds to short-range (i.e. high-frequency) variations in the intensity of the pixels whereas tendency relates to longer-range (i.e. low-frequency) variations in the intensity of the pixels.

Here, it is the texture, and above all its anisotropy, that is of interest for characterization of the image 2. For example, when the image 2 represents a biological tissue, the anisotropic character of the texture of the image may give an indication as to the presence or the risk of development of cancerous cells within this tissue. In this example, the image 2 is a mammogram.

Figure 1B:
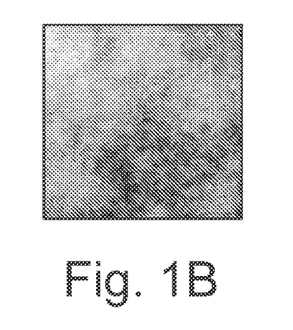
Figure 1C:
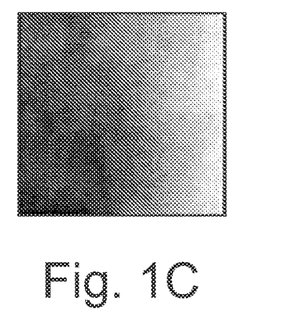
Figure 1D:
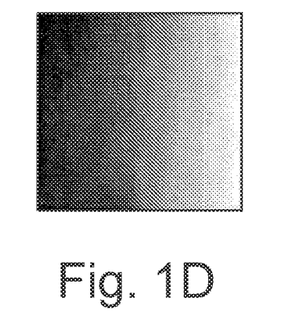

FIGS. 1B to 1D illustrate other examples of images that could correspond to a mammogram. FIG. 1B shows an image the texture of which is isotropic. FIGS. 1C and 1D respectively show images the texture of which is isotropic and anisotropic and that each comprise an anisotropy caused by a polynomial tendency of the second order. This tendency is oriented in the horizontal direction of these images.

Image 2 is formed from a plurality of pixels. Each pixel is associated with:
  a pixel intensity value, and with
  a position p in the space $\mathbb{Z}^d$
where d is a natural integer higher than or equal to 2 that represents the dimension of the image 2. Here, in this example, d=2.

Thus, spatially the pixels of the image 2 are arranged in a lattice in the space $\mathbb{Z}^d$. Preferably, the resolution of the image is the same along all the d axes of the image. Below, the set of possible positions of the pixels of the image 2 is denoted $[0, N]^d$, where N is a vector that codes the size of the image and the components of which are strictly positive natural integers belonging to $\mathbb{N}^d$. This notation means that the $p_1, p_2, \ldots, p_d$ coordinates of the position p of a pixel of the image belong, respectively, to the sets $[0,N_1]$, $[0, N_2]$, ..., $[0, N_d]$, where $N_1, N_2, \ldots, N_d$ are the coordinates of N. Here, the image 2 has a square shape of $(N_1+1)*(N_2+1)$ size, where $N_1+1=N_2+1$ and $N_1+1$ is the length of one side of this square expressed in number of pixels. For example, the image 2 is a zone of interest extracted from an image of larger size. The sides of the image 2 have a length larger than or equal to 50 pixels or to 100 pixels or to 500 pixels.

In this example, the light intensity of the pixels is encoded in grayscale, in 8-bit grayscale for example. The pixel intensity values are integer numbers belonging to the interval [0,255].

Figure 2:
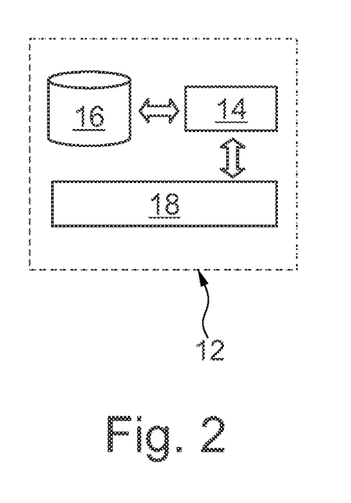
FIG. 2 is a schematic illustration of a computing device for automatically characterizing the anisotropy of a digital image.

FIG. 2 shows a device 12 for identifying and characterizing the anisotropy of the texture of the image 2. The device 12 is able, for a given image 2, to indicate whether the image is isotropic or anisotropic and, advantageously, in the latter case, to quantify, i.e. characterize, the amplitude of the anisotropy.

The device 12 comprises to this end:
  a programmable computer 14, such as a microprocessor,
  a data storage medium 16, such as a memory,
  an interface 18 for acquiring a digital image.

The interface 18 allows the image 2 to be acquired. Typically, the digital image is generated by an electronic image-capturing apparatus such as a radiography apparatus. The computer 14 executes the instructions stored in the medium 16. The medium 16 in particular contains instructions for implementing the method of FIGS. 3 and 4, which will be described in more detail below.

The anisotropy of the image 2 is identified and characterized using a certain number of operations.

In this example, the image 2 is modelled as an intrinsic random gaussian field. In other words, the intensity value associated with each pixel of the image 2 is said to correspond to a Gaussian random variable Z. The concept of intrinsic random gaussian fields is defined in more detail in the following works: J. P. Chilès et al. "Geostatistics: Modeling Spatial Uncertainty", J. Wiley, $2^{nd}$ edition, 2012.

The intensity value associated with the pixel the position of which in the image 2 is given by the position p is denoted Z[p]. For example, an orthonormal coordinate system having as origin the null vector $(0)^d$ is defined in $\mathbb{Z}^d$. The position p belongs to $\mathbb{Z}^d$.

An example of an implementation of the method for automatically characterizing the anisotropy of a texture will now be described with reference to the flowchart of FIG. 3 and to FIGS. 1 and 2.

In a step 20, the image 2 is automatically acquired by the interface 18 and stored, for example, in the medium 16. The notation "I" will be used below to refer to this image 2.

In this example, of dimension d=2, the normalized image 2 is modelled by a square matrix $\underline{Z}$ of $(N_1+1)*(N_2+1)$ size. The coefficients of this matrix $\underline{Z}$ are the Z[p] corresponding to the intensity of the pixels of position p. The components of the vector p give the position of this coefficient in the matrix $\underline{Z}$. For example, Z[p] is the coefficient of the $p_1$-th row and the $p_2$-th column of $\underline{Z}$, where $p_1$ and $p_2$ are the coordinates of the position p in $[0, N]^2$.

Next, in a step 22, geometric conversions are applied to the image 2 in order to obtain a series of converted images $I_{j,k}$. These conversions comprise modifications $T_{j,k}$ of the image 2 that each include:
  a rotation by an angle $\alpha_j$, and
  scaling by a scale factor $\gamma_k$.

Below, the image obtained after the modification $T_{j,k}$ has been applied to the acquired image I is denoted $T_{j,k}(I)$.

Each modification $T_{j,k}$ is characterized uniquely by a vector $u_{jk}$ of the space $\mathbb{Z}^2\backslash\{(0,0)\}$, such that $\alpha_j=\arg(u_{jk})$ and $\gamma_k=|u_{jk}|^2$. The space $\mathbb{Z}^2\backslash\{(0,0)\}$ is the space $\mathbb{Z}^2$ deprived of the point of coordinates (0,0).

The indices "j" and "k" are integer indices that uniquely identify the angle $\alpha_j$ and the factor $\gamma_k$, respectively. The index j varies between 1 and $n_j$. To simplify notation, "rotation j" and "scaling k" will be spoken of below when referring to a rotation of angle $\alpha_j$ and to scaling by a factor $\gamma_k$, respectively.

The rotation j makes each of the pixels of the image 2 rotate by the angle $\alpha_j$ from a starting position to an end position about the same predetermined point or the same predetermined axis. Typically, this point or this axis of rotation passes through the geometric center of the image. The rotation here occurs about the geometric center of the image. The geometric center of a digital image is defined as being the centroid of the positions of all of the pixels of the image, each weighted by a coefficient of the same value.

The scaling k enlarges or shrinks the image via a homothety of factor $\gamma_k$. In the following examples, the center of the homothety is the geometric center of the image.

These modifications $T_{j,k}$ are applied for at least two, and, preferably, at least three or four angles $\alpha_j$ of different values. Advantageously, the various values of the angles $\alpha_j$ are distributed as uniformly as possible between 0° and 180° while respecting the constraint that the vector $u_{jk}$ must belong to the space $\mathbb{Z}^2 \setminus \{(0,0)\}$. The number $n_j$ of different values for the angle $\alpha_j$ is generally chosen not to be too high in order to limit the number of calculations to be carried out. For example, this number $n_j$ is chosen to be lower than 150 or 100. A good compromise consists in choosing at least four different values for the angle $\alpha_j$ and, preferably at least 10 or 20 different values. For each angle $\alpha_j$, modifications $T_{j,k}$ are applied for at least two, and, preferably, at least three or four or five, different scalings $\gamma_k$.

The values of the factor $\gamma_k$ are for example higher than or equal to 1 and lower than or equal to $10^2$ or $8^2$ or $4^2$. Preferably, the various values of the factor $\gamma_k$ are distributed as uniformly as possible in the chosen interval of values. For example, here, the scalings $\gamma_k$ used are all scalings for which the following condition is met: the Euclidean norm of the vector $u_{jk}$ belongs to the interval [$\sqrt{2}$; 10].

For example, the angles of rotation $\alpha_j$ are chosen depending on the horizontal and vertical directions of the image 2. For example, to make two rotations j1 and j2, values $\alpha_{j1}=90°$ and $\alpha_{j2}=180°$ are chosen, where j1 and j2 are particular values of the index j. The angles are here expressed with respect to the horizontal axis of the image 2.

In this example, of dimension d=2, the modifications $T_{j,k}$ applied are the following, expressed here in matrix form:

$$T_{j,k} = \gamma_k \begin{bmatrix} \cos(\alpha_j) & -\sin(\alpha_j) \\ \sin(\alpha_j) & \cos(\alpha_j) \end{bmatrix}$$

In step 22, K-increments are calculated for each of the converted images $T_{j,k}(I)$. This calculation includes filtering intended to remove tendencies of polynomial form of order strictly lower than K. More precisely, for each image $T_{j,k}(I)$, a filter is applied allowing the K-increment $V_{j,k}$ of this image $T_{j,k}(I)$ to be calculated. It is the K-increment of this image $T_{j,k}(I)$ that forms the converted image $I_{j,k}$. The K-increment $V_{j,k}$ of this image is not calculated for all the points of the image $T_{j,k}(I)$, but only for certain thereof as will be seen below.

The K-increment concept is for example defined in more detail in the following work: J. P. Chilès et al. "Geostatistics: Modeling Spatial Uncertainty", J. Wiley, $2^{nd}$ edition, 2012.

Here, the filtering is carried out by means of a convolution kernel denoted "v", in order to achieve linear filtering. Below, the "filter v" will be spoken of when referring to this convolution kernel.

The filter v is defined for the set $[0,L]^d$. This filter v is characterized by a characteristic polynomial $Q_v(z)$ defined by:

$$\forall z \in \mathbb{R}^d, Q_v(z) = \sum_{p \in [0,L]^d} v[p] z^p$$

Here, the filter v is a matrix and the quantity v[p] is a particular scalar value for this filter for the position p, where p is a vector of $[0,L]^d$. This value v[p] is zero if the vector p does not belong to $[0,L]^d$. Equivalently, the filter v is also said to have a bounded support in $[0,L]^d$. This filter v is different from the null function that, for any value of the vector p, has a value v[p] of zero. The notation $z^p$ here designates the monomial $z_1^{p1} * z_2^{p2} * \ldots * z_d^{pd}$.

The filter v is thus parameterized with the vector L, which is a vector of $[0, N]^d$. Generally, the vector L is chosen so as to be contained in the image I. Therefore, preferably, values of L are used that respect, for any i ranging from 1 to d, the relationship $L_i \ll N_i$, i.e. $L_i$ is lower than 10 times or 100 times $N_i$.

In addition, the filter v is such that its characteristic polynomial $Q_v(z)$ meets the following condition:

$\forall \alpha \in [0,K]^d$ such that $|\alpha| \le K$ then $$\frac{\partial^{|\alpha|} Q_v}{\partial z_1^{a_1} \ldots \partial z_d^{a_d}}(1, \ldots, 1) = 0$$

where the constant K is a nonzero natural integer and $\partial^{|\alpha|} Q_v / \partial z_1^{a_1} \ldots \partial z_d^{a_d}$ is the partial derivative of the polynomial $Q_v(z)$ with respect to the components of the vector z, the symbol $\partial z_i^{ai}$ indicating a differentiation of the polynomial $Q_v(z)$ of order $a_i$ with respect to the variable $z_i$, where $z_i$ is the i-th component of the vector z and $a_i$ is the i-th component of the vector a, i being an integer index higher than or equal to 0 and lower than or equal to d.

Filtering the image $T_{j,k}(I)$ with the filter v allows the effect of "tendency" to be removed from the subsequent calculations of the method when said tendency takes the form of a polynomial of order $P_o$, provided that the value of the constant K is chosen as follows:

$K \ge P_o + 1$ if d is lower than or equal to 4, and
$K \ge P_o/2 + d/4$ if d>4.

The K-increments of the image $T_{j,k}(I)$, denoted $V_{j,k}$, are then calculated by virtue of the filter v as follows:

$$V_{j,k}[m] = \sum_{p \in [0,L]^d} v[p] \cdot Z[m - T_{j,k} \cdot p]$$

where:
- $V_{j,k}[m]$ is a K-increment calculated in the image $T_{j,k}(I)$ for the pixel of position m, with m a vector belonging to a set E that will be defined below;
- the product $T_{j,k} \cdot p$ corresponds to the application of the modification $T_{j,k}$ to the pixel of position p of the image I and expresses the coordinates in $\mathbb{Z}^d$, after application of the modification $T_{j,k}$, of the pixel that initially had the position p in the image I,
- v[p] is the value of the filter v for the value of p.

For each image $T_{j,k}(I)$, the K-increment is calculated only for those pixels of the image $T_{j,k}(I)$ the positions of which belong to a set E. The set E only contains positions:
- that belong to the image I, and
- that, whatever the applied modification $T_{j,k}$, occupy a position that already exists in the image I, after application of this modification $T_{j,k}$.

Furthermore, for any position m belonging to E, the pixels of positions "m−$T_{j,k}$·p" occupy a position contained in the image I.

The number of positions that belong to the set E is denoted $n_E$.

Thus, quadratic variations are calculated solely for those points of the converted image for which no interpolation is necessary. It is thus possible to make use of rotations j of any angle, in contrast to the case of projections. Specifically, if a projection is carried out in a, for example, diagonal direction of the image, some projected points have a position that does not belong to the set $[0,N]^d$. In other words, they do not form part of the lattice. It is therefore necessary to employ an interpolation in order to determine the intensity value associated with the points that do belong to this lattice. This introduces an approximation and therefore an error. With the modifications $T_{j,k}$ and then the selection of the points of the set E, the reliability of the method is improved.

In this example, the filtering is carried out within the same formula as the application of the modifications $T_{j,k}$.

With this choice of the constant K, the filtering generates increments $V_{j,k}[m]$ of order K. This filtering makes it possible to not take into account any anisotropy of the images caused by tendency, but rather only the anisotropy of the texture of the underlying image. As a result, the reliability of the characterizing method is improved.

The constant K must therefore be chosen as described above depending on the nature of the tendency present in the image 2. Typically, in the case of a mammogram, the polynomial degree $P_o$ of the tendency is lower than or equal to 2. For example, a value is selected by a user of the method. To this end, step 22 here comprises acquiring a value of the vector L and a value of the constant K.

In this example, the filter v is chosen as follows:

$$v[p] = (-1)^{|p|} \times C_{L_1}^{p_1} \times \ldots \times C_{L_d}^{p_d} = (-1)^{|p|} \times \prod_{i=1}^{d} \frac{L_i!}{p_i! \times (L_i - p_i)!}$$

if the vector p belongs to $[0,L]^d$ and $v[p]=0$ if not, where the terms $C^p_L$ are binomial coefficients.

With this particular filter, the condition expressed above on the characteristic polynomial $Q_v(z)$ is met if K=|L|−1. Thus, the value of K is deduced from the acquired value of the parameter L.

Thus, in this particular case, filtering the image $T_{j,k}(I)$ with the filter v allows the effect of "tendency" to be removed when the latter has a polynomial form of order $P_o$, provided that the parameter L is chosen as follows:

|L|=$P_o$+2 if d is lower than or equal to 4, and

|L|=$P_o$/2+d/4+1 if d>4.

In this example, of dimension d=2, the vector L has two components, $L_1$ and $L_2$. To remove a tendency of polynomial degree $P_o$=2, it is necessary to choose $L_1$ and $L_2$ such that |L| is equal to four. Preferably $L_1$ and $L_2$ are chosen such that $L_1$=4 and $L_2$=0. Specifically, by choosing values, for the coordinates of the vector "L", that are sufficiently different from each other, the directional sensitivity of the filter is increased. Thus, it will react more markedly, and will therefore filter more effectively, variations that are oriented in one particular direction. In contrast, a filter for which $L_1$ and $L_2$ are chosen such that $L_1$=2 and $L_2$=2 would be less sensitive to directional signals and less effective.

In this embodiment, the filter v is defined by the following relationship:

$$v[p] = (-1)^{p_i} \frac{L_1!}{p_1!(L_1 - p_1)!} \quad (1)$$

if the vector p belongs to $[0,L] \times \{0\}$ and $v[p]=0$ if not, where $L_1$ belongs to $\mathbb{N}\setminus\{0\}$. Here, $L_1$=4. Under these conditions, the order of the kernel v is equal to K=$L_1$−1.

In this step, step 22, for each different value of j and k, the computer 14 carries out in succession the following operations:

application of the modification $T_{j,k}$ to the image 2 in order to obtain the image $T_{j,k}(I)$, then application of the filter v to the image $T_{j,k}(I)$ in order to obtain the converted image $I_{j,k}$.

Next, in a step 24, for each image $I_{j,k}$, the p-variation $W_{j,k}$ associated with this image $I_{j,k}$ is calculated. The concept of p-variations is well known to those skilled in the art of statistics and probabilities. Here, it is calculated in the following way:

$$W_{j,k}[m] = \frac{1}{n_E} \sum_{m \in E} (V_{j,k}[m])^q$$

In the above equation, the symbol "q" is used instead of the symbol "p" conventionally used in this equation in order to avoid any confusion with the symbol "p" used in this description to designate the position of a pixel. In this example, a particular form of p-variations is used: "quadratic variations" or "2-variations", for which q=2. Thus, the quadratic variation $W_{j,k}$ of the image $I_{j,k}$ is calculated in the following way, from the K-increments calculated after filtering in step 22:

$$W_{j,k}[m] = \frac{1}{n_E} \sum_{m \in E} (V_{j,k}[m])^2$$

These quadratic variations $W_{j,k}$ contain information that is important for the identification of anisotropy. To extract this information, the procedure is as follows.

In a step 26, a covariance analysis comprising a statistical regression is carried out on all the variations $W_{j,k}$ calculated for each of the images $I_{j,k}$ in order to estimate:

the value of the Hurst exponent H of the image I and, a term $\beta_j$.

The statistical regression is defined by the following relationship:

$$\log(|W_{j,k}|) = \log(|u_{jk}|^2) * H + \beta_j + \varepsilon_{j,k},$$

where:

$|u_{jk}|^2$ is the Euclidean norm to the power of two of the vector $u_{jk}$;

H is the Hurst exponent of the image I;

$\beta_j$ is a quantity that does not depend on the scaling k; here this parameter is analogous to a so-called intercept parameter of the regression, unless it depends on the rotations j;

$\varepsilon_{j,k}$ is an error term of the regression the statistical properties of which are predetermined and set by the user. For example, the error terms $\varepsilon_{j,k}$ are intercorrelated Gaussian random variables.

It will be recalled that the Hurst exponent H is a physical quantity that is independent of the rotations of the image.

Thus, a number $n_j$ of terms $\beta_j$ is obtained, $n_j$ being the number of different rotations applied to the image I.

For example, if it is decided to make do with only the two rotations j1 and j2 described above, the regression is carried out on the basis of all the quadratic variations calculated for j1 and for j2. Thus, two terms $\beta_{j1}$ and $\beta_{j2}$ are obtained.

At this stage, in a step 28, the computer 14 estimates the scalar coefficients $\tau_m$ of an even function $\tau(\theta)$ called the asymptotic topothesia function. The function $\tau(\theta)$ is continuous in the interval $[0; 2\pi]$. The function $\tau(\theta)$ is a function that minimizes the following criterion C:

$$C = \sum_{j=1}^{n_j} (\beta_j - \tau * \Gamma(\alpha_j))^2 \quad (2)$$

where:
the symbol "$\tau*\Gamma(\theta)$" designates the function obtained by carrying out the circular convolution of the functions $\tau(\theta)$ and $\Gamma(\theta)$,
$\Gamma(\theta)$ is the function defined by the following relationship:

$$\Gamma(\theta) = \int_{\mathbb{R}_+} |\hat{v}(\rho\theta)|^2 \rho^{-2H-1} d\rho$$

where:
$\hat{v}$ is the discrete Fourier transform of the kernel v,
H is the Hurst exponent of the acquired image,
$\rho$ is the variable of integration.

The scalar coefficients $\tau_m$ of the function $\tau(\theta)$ are defined by the following relationship:

$$\tau(\theta) = \sum_{m=0}^{M} \tau_m f_m(\theta)$$

where:
M is an integer number higher than one,
$\tau_m$ are the scalar coefficients of the function $\tau(\theta)$,
$f_m(\theta)$ are the functions of a basis of $\pi$-periodic functions defined in the interval $[0; 2\pi]$.

A $\pi$-periodic function is a periodic function of period $\pi$.
In this embodiment, the $\pi$-periodic function basis used is a Fourier basis. Therefore, the function $\tau(\theta)$ is here defined by the following relationship:

$$\tau(\theta) = \tau_0 + \sum_{m=1}^{M} (\tau_{1,m}\cos(2m\theta) + \tau_{2,m}\sin(2m\theta))$$

where $\tau_0$, $\tau_{1,m}$ and $\tau_{2,m}$ are the scalar coefficients of the function $\tau(\theta)$, The number M is a constant that is defined beforehand, for example by the user. Generally, this number M is lower than the number $n_j$ of different angles $\alpha_j$. Typically, this number M is also higher than or equal to 2 or 4. Typically, the number M is chosen so that the number of scalar coefficients of the function $\tau(\theta)$ is comprised in the interval $[0.35n_j; 0.75n_j]$ or in the interval $[0.45n_j; 0.55n_j]$.

In this embodiment, and in the context specified above, it has been possible to establish a linear relationship between an approximation $\tau^*$ of the coefficients of the function $\tau(\theta)$ and the estimated terms $\beta_j$. This relationship is the following:

$$\tau^* = (L^T L + \lambda R)^{-1} L^T \underline{\beta} \quad (3)$$

where:
$\tau^*$ is the vector $(\tau_0^*, \tau_{1,1}^*, \tau_{2,1}^*, \tau_{1,2}^*, \tau_{2,2}^*, \ldots, \tau_{1,M-1}^*, \tau_{2,M-1}^*, \tau_{1,M}^*, \tau_{2,M}^*)^T$, the coefficients $\tau_0^*, \tau_{1,1}^*, \tau_{2,1}^*, \tau_{1,2}^*, \tau_{2,2}^*, \ldots, \tau_{1,M-1}^*, \tau_{2,M-1}^*, \tau_{1,M}^*, \tau_{2,M}^*$ being the estimates of the coefficients $\tau_0, \tau_{1,1}, \tau_{2,1}, \tau_{1,2}, \tau_{2,2}, \ldots, \tau_{1,M-1}, \tau_{2,M-1}, \tau_{1,M}, \tau_{2,M}$, respectively L is a matrix of $n_j \times (2M+1)$ size the k-th column of which is defined by the following relationship:

$(\hat{\mu}[0], \hat{\mu}[1]\cos(\alpha_k), \hat{\mu}[1]\sin(\alpha_k), \ldots, \hat{\mu}[M]\cos(M\alpha_k), \hat{\mu}[M]\sin(M\alpha_k))$ where $\hat{\mu}[0], \hat{\mu}[1], \ldots, \hat{\mu}[M]$ are the coefficients of the discrete Fourier transform of the following function $\mu(\theta)$: $\mu(\theta) = |\cos(\theta)|^{2H}$, where H is the Hurst exponent of the acquired image, $\lambda$ is a predetermined parameter,
R is a diagonal matrix of $(2M+1)\times(2M+1)$ size the coefficients of which on the diagonal are, in order: 0, 2, 2, 5, 5, ..., $(1+M^2)$, $(1+M^2)$,
the symbol "$^T$" designates the transpose operation,
$\underline{\beta}$ is the vector $(\beta_1, \beta_2, \ldots, \beta_{nj-1}, \beta_{nj})^T$.

The inventors have also established that the optimum value of the parameter $\lambda$ is equal or very close to a value $\lambda^*$. The value $\lambda^*$ is obtained using the following relationship:

$$\lambda^* = \frac{\kappa}{(1+M^2)} \frac{\text{trace}(V(\underline{\beta}))}{|\underline{\beta}|^2} \quad (4)$$

where:
$\kappa$ is equal to $v_+/v_-$, $v_+$ and $v_-$ being the lowest and the highest eigenvalues of the matrix $L^T L$, respectively,
trace(X) is a function that returns the sum of the diagonal coefficients of a square matrix X,
$V(\underline{\beta})$ is the covariance matrix of the estimator of the vector $\underline{\beta}$,
$|\underline{\beta}|^2$ is the Euclidean norm to the power of two of the vector $\underline{\beta}$.

Thus, in this embodiment, in step 28, the computer 14 calculates the value $\lambda^*$ using the above relationship. Next, it chooses a value of the parameter $\lambda$ close to the value $\lambda^*$. For example, it chooses, randomly for example, a value of the parameter $\lambda$ in the interval $[0; 1.3\lambda^*]$ or $[0; 1.1\lambda^*]$. Most often, the value of the parameter $\lambda$ is chosen in the interval $[0.7\lambda^*; 1.3\lambda^*]$ or $[0.9\lambda^*; 1.1\lambda^*]$. Here, the value of the parameter $\lambda$ is systematically set equal to the value $\lambda^*$. Lastly, the computer estimates the coefficients $\tau_0, \tau_{1,m}, \tau_{2,m}$ using relationship (3).

The relationship (4) was established by searching for a numerical expression for the coefficients $\tau_0^*, \tau_{1,m}^*, \tau_{2,m}^*$ that minimizes not the criterion C directly but a penalized criterion $C_A$. This penalized criterion $C_A$ is for example the following:

$$C_A = C - \lambda \sum_{m=1}^{M} (1+m^2)(\tau_{1,m}^2 + \tau_{2,m}^2) \quad (5)$$

The term that is subtracted from the criterion C in relationship (4) is known as the "penalty".

In addition, in the case where the filter v is that defined by relationship (1), then the circular convolution τ*Γ(θ) may be written in the following form:

$$\tau * \Gamma(\theta) = \gamma \, \tau * \mu(\theta) \quad (6)$$

where:

μ(θ) is defined by the following relationship:

$$\mu(\theta) = |\cos(\theta)|^{2H}$$

γ is a constant that is independent of the value θ, the symbol "*" is a circular convolution such that τ*μ(θ) is the function resulting from the circular convolution of the functions τ(θ) and μ(θ).

The constant γ is defined by the following relationship:

$$\gamma = 2 \int_{\mathbb{R}+} |\hat{v}(\rho)|^2 \rho^{-2H-1} d\rho$$

where the symbols used in the above relationship were defined above and $|\ldots|^2$ is the Euclidean norm to the power of two.

Thus, the penalized criterion $C_A$ may be written in the following form:

$$C_A = |L\tau - \beta|^2 + \lambda \tau^T R \tau$$

where the symbols L, τ, β, λ and R were defined above and $|\ldots|^2$ is the Euclidean norm to the power of two. The vector τ* is the numerical solution of the criterion $C_A$.

For a given value of the angle θ comprised between zero and π, the value of the function τ(θ) depends on the characteristics of the texture of the image in the direction θ. This value is independent of the value of the Hurst exponent H. Thus, the statistical dispersion of the values of the function τ(θ) for θ varying between 0 and π is representative of the anisotropy of the texture of the image. For example, the statistical dispersion of the function τ(θ) is represented by an index A that is dependent on the sum of the following deviations: $|\tau - M_\tau|_{Lp}$ for θ varying between 0 and π, where:

τ is the function τ(θ), $M_\tau$ is an average value of the values of the function τ(θ) for θ varying from 0 to π or an approximation of this average, and $|\ldots|_{Lp}$ is the norm L1 if Lp is equal to 1, the norm L2 if Lp is equal to 2 and so on, Lp being strictly higher than zero.

Thus, the statistical dispersion of the function τ(θ) may be the variance or the standard deviation of the values of this function in [0; π]. For example, here, Lp is chosen equal to 2 and the calculated index A is equal to the square root of the sum defined above. Thus, the higher the value of the index A, the greater the anisotropy of the image. Under these conditions, the index A is defined by the following relationship:

$$A = \sqrt{\int_{[0,\pi[} (\tau(\varepsilon) - M_\tau)^2 d\varepsilon} \quad (7)$$

Here, in a step 30, the computer 14 calculates the index A using the following formula, which corresponds to relationship (7):

$$A = \sqrt{\sum_{m=1}^{M} (\tau_{1,m}^{*2} + \tau_{2,m}^{*2})}$$

Figure 4:
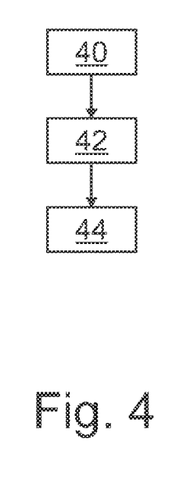
FIG. 4 is a flowchart of a method for automatically classifying images depending on the anisotropy of their texture.
Figure 5A:
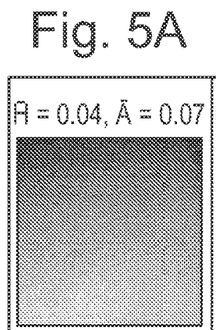
FIGS. 5A to 5F are illustrations of digital images of the texture of various types of paper.
Figure 5B:
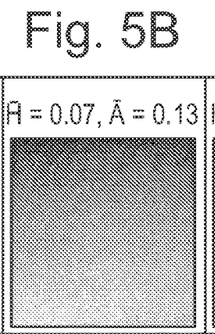
Figure 5C:
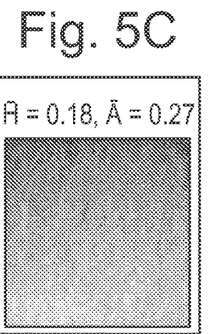
Figure 5D:
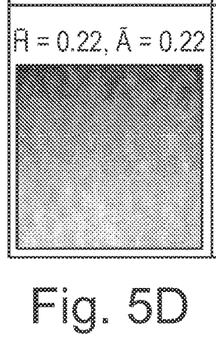
Figure 5E:
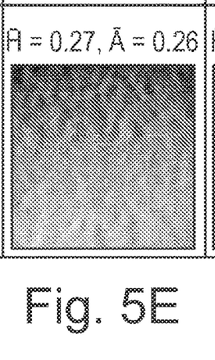
Figure 5F:
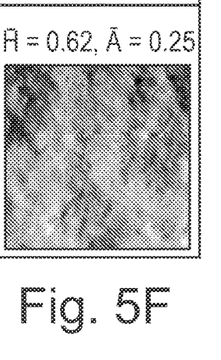

The flowchart of FIG. 4 describes an example of application of the above method to the automatic classification of images 2 with respect to one another depending on their texture. This example is given in the particular case where the images are photographs of sheets of paper taken using a microscope and under grazing illumination. Such captured images are illustrated in FIGS. 5A to 5F. FIGS. 5A to 5C show images of sheets of gloss paper from three different manufacturers. FIGS. 5D and 5E show images of sheets of satin paper. FIG. 5F shows an image of a sheet of matte paper. The databases containing these images are described in detail in the following articles:

R. Johnson, P. Messier, W. Sethares, et al: "Pursuing automated classification of historic photographic papers from raking light images", J. AM. Inst. Conserv. 53(3):159-170, 2014, and P. Messier, R. Johnson, H. Wilhelm, W. Sethares, A. Klein, et al: "Automated surface texture classification of inkjet and photographic media", In NIP & Digital Fabrication Conference, pages 85-91, Society for Imaging Science and Technology, 2013.

In a step 40, a plurality of digital images 2 are automatically acquired. Among the acquired images, certain correspond to gloss paper, others to satin paper and others to matte paper.

Figure 3:
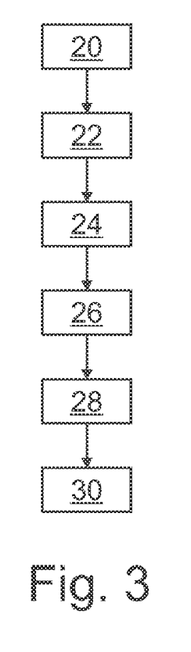
FIG. 3 is a flowchart of a method for characterizing the anisotropy of the texture of a digital image.

In a step 42, for each of these images, the anisotropy index A and the Hurst exponent H are calculated by implementing the method of FIG. 3. In this particular case, the method of FIG. 3 was implemented with M=23 and $n_j$=96.

In a step 44, the acquired images are automatically classified with respect to one another depending on their index A and exponent H calculated in step 42. This classification is for example achieved by means of a classifier such as a classifying algorithm based on neural networks or a support vector machine.

Figure 6:
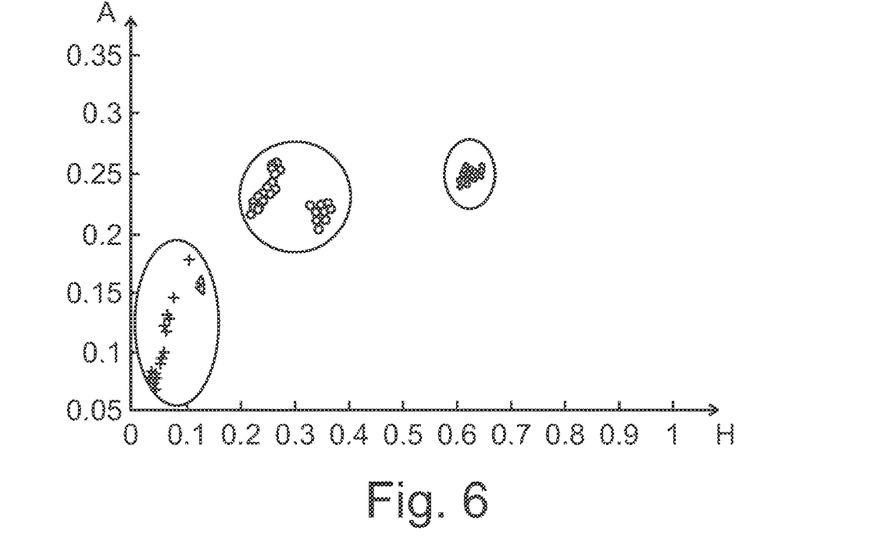
FIG. 6 is a graph showing the distribution of the texture of various papers as a function of their Hurst exponent and of their anisotropy index.

The graph of FIG. 6 shows for each image a point of coordinates (H, A), where H and A are the Hurst exponent and anisotropy index calculated for this image, respectively. Here, the function τ(θ) has been normalized. In this graph, the points represented by crosses, circles and rhombi correspond to images of a piece of gloss, satin and matte paper, respectively. This graph shows that the combination of the Hurst exponent H and of the anisotropy index A allows the various types of paper to be effectively distinguished between. Here, all the pieces of gloss, satin and matte paper are in very different zones. These zones are encircled in the graph of FIG. 6. In addition, inside a given zone, a bunch of points grouped together in an even smaller zone often corresponds to one particular manufacturer or to one particular batch. Thus, the classification is able not only to distinguish between various types of paper but also, for a given type of paper, distinguish between different manufacturers or different batches.

Variants of the Image:

The pixels of the image 2 may have other intensity values. The intensity value of each pixel may be a real value. Or it may be higher than 256. For example, the image 2 is color-coded. In this case, the color image is separated into a plurality of monochromatic images each corresponding to one of the color channels used to form the color image. The method is then applied separately to each of these monochromatic images.

The image 2 may not have a square shape. For example, when of dimension d=2, the image may have a rectangular or even trapezoidal shape. When the image does not have a regular shape, the notions of "horizontal" and "vertical" direction are replaced by reference directions suited to the geometry of the image. For example, in the case of an image of triangular shape, the base and height of the triangle will be used as reference.

The dimension d of the images may be higher than two. For example, the image 2 may be a hypercube of dimension d.

The image 2 may be other than a mammogram or a photograph or a sheet of paper. For example, it may be a question of a photograph of a bone tissue. The anisotropy of the texture of the image then provides information on the presence of bone pathologies, such as osteoporosis. Other broader fields of application may be envisioned, such as other types of biological tissues, aerial or satellite images, geological images, or photographs of materials. Generally, the method is applicable to any type of irregular and textured image such as an image obtained from any image-capturing electronic apparatus.

Variants of the Method for Estimating the Terms $\beta_j$ and H:

Other modifications $T_{j,k}$ may be used. For example, when the dimension d=3, the modifications $T_{j,k}$ cause a rotation j about a given axis of rotation and a scaling k in a given direction of the image. For example, the following modifications may be used:

$$T_{j,k} = \mathcal{Y}_k \begin{bmatrix} \cos(\alpha_j) & -\sin(\alpha_j) & 0 \\ \sin(\alpha_j) & \cos(\alpha_j) & 0 \\ 0 & 0 & y_k \end{bmatrix}$$

$$T_{j,k} = \mathcal{Y}_k \begin{bmatrix} \cos(\alpha_j) & 0 & -\sin(\alpha_j) \\ 0 & y_k & 0 \\ \sin(\alpha_j) & 0 & \cos(\alpha_j) \end{bmatrix}$$

$$T_{j,k} = \mathcal{Y}_k \begin{bmatrix} y_k & 0 & 0 \\ 0 & \cos(\alpha_j) & -\sin(\alpha_j) \\ 0 & \sin(\alpha_j) & \cos(\alpha_j) \end{bmatrix}$$

The above modifications $T_{j,k}$ cause a rotation about an axis and a scaling in a direction that is not parallel to this axis.

The values of the angle $\alpha_j$ may be different. Preferably, values of the angle $\alpha_j$ that do not require interpolations are chosen. However, it is also possible to choose values of the angle $\alpha_j$ such that it is necessary to interpolate the pixels of the converted image to find the values associated with each position p comprised in the set E.

As a variant, the rotation and the scaling are not applied at the same time.

Other filters v may be used to calculate the K-increments. For example, to calculate the K-increments it is also possible to use any filter the convolution kernel of which is defined as being equal to the convolution:
of any convolution kernel v1, and
of a convolution kernel v2 equal to the kernel v described above.

In the particular case where the kernel v1 is an identity matrix, the filter v described above is obtained. In contrast, choosing a kernel v1 different from the identity matrix makes it possible to construct many different filters from the filters v described above, all suitable for calculating the K-increments.

The filtering may be implemented differently in step 22. In particular, the conversion and the filtering are not necessarily applied simultaneously, but in separate formulas.

As a variant, all the conversions $T_{j,k}$ are first applied to the image I, then, subsequently, the filters are applied to each of the images $T_{j,k}(I)$.

The value of K may be different. In particular, with the filter v chosen in the example, when the image I has no tendency, i.e. when M equals 0, then preferably |L|=2 or, if d>4, |L|=1+d/4.

As a variant, a plurality of filters $v_i$ are applied to each image $T_{j,k}(I)$ in step 22. The number of different filters $v_i$ applied to a given image $T_{j,k}(I)$ is denoted R. In this case, the converted image obtained by applying filter $v_i$ to image $T_{j,k}(I)$ is denoted $I_{i,j,k}$ and the K-increment of this image at position m in this image is denoted $V_{i,j,k}[m]$ where "i" is an index that uniquely identifies the applied filter $v_i$. This index "i" is here different from the index "i" used above as dummy variable in particular with reference to the partial derivative of the polynomial $Q_v(z)$. Therefore, it is thus possible to calculate a plurality of quadratic variations for each image $T_{j,k}(I)$, one for each filter $v_i$ applied to this image $T_{j,k}(I)$. Thus, the quadratic variation calculated for the image $I_{i,j,k}$ is denoted $W_{i,j,k}$.

To this end, step 22 comprises an operation of selecting filters $v_i$, for example from a predefined filter library.

The quadratic variations $W_{i,j,k}$ are then calculated in step 24 using the following relationship:

$$W_{i,j,k}[m] = \frac{1}{n_E} \sum_{m \in E} (V_{i,j,k}[m])^2$$

In step 26, the regression is then carried out in the following way, on account of the $n_i$ applied filters: $\log(|W_{i,j,k}|) = \log(|\mu_{j,k}|^2)*H + \beta_{i,j} + \varepsilon_{i,j,k}$, where:

$\beta_{i,j}$ is the term $\beta_j$ associated with the filter $v_i$;

$\varepsilon_{i,j,k}$ is the error term $\varepsilon_{j,k}$ associated with the filter $v_i$.

Thus, a number $n_b$ of terms $\beta_{i,j}$ is obtained, where $n_b = n_j * n_i$, $n_j$ being the number of different rotations applied to the image I. In step 28, the method of FIG. 3 is implemented for each filter $v_i$. Thus, scalar coefficients are obtained for i functions $\tau_i(\theta)$. The anisotropy index A is then calculated from the approximated coefficients of each of these functions $\tau_i(\theta)$. For example, in a simplified embodiment, an anisotropy index $A_i$ is calculated as described above for each of the functions $\tau_i(\theta)$, the calculated index A then being the average of these indices $A_i$.

When a plurality of filters $v_i$ are used, the number of filters $v_i$ applied may vary from one image $T_{j,k}(I)$ to the next, provided however that to one filter i there correspond at least two rotations j and, for each of these rotations j, at least two scalings k.

Variants of the Estimation of $\tau^*$:

The penalty used in the criterion $C_A$ may be different. Provided that the penalty is a differentiable function, then it is possible to determine a linear relationship, such as relationship (3), that directly expresses the estimation of the coefficients $\tau_m$ as a function of the terms $\beta_j$. In particular, it is possible to find such a linear relationship whatever the filter v and the basis of $\pi$-periodic functions $f_m(\theta)$ used. The filter v may therefore be different from that defined by relationship (1) and the basis used may also be different from the Fourier basis. When the filter v is different from that defined by relationship (1) or when the basis is different from the Fourier basis, the linear relationship is different from that defined by relationship (3).

The penalty used in the criterion $C_A$ may also be a non-differentiable function. In this case, it may be difficult or even impossible to establish a linear relationship between the estimate of the coefficients $\tau_m$ and the terms $\beta_j$. For example, the penalty may use a norm L1 of the function $\tau(\theta)$ that is non-differentiable. In this case, other methods may be used to approximate the coefficients of the function $\tau(\theta)$ that minimizes this penalized criterion. For example, the estimate of the coefficients $\tau_0$, $\tau_{1,m}$, $\tau_{2,m}$ that minimize the criterion $C_A$ are estimated by executing a known minimization algorithm such as the iterative shrinkage-thresholding algorithm (ISTA) or the fast iterative shrinkage-thresholding algorithm (FISTA).

The variant described here allows the values of the coefficients $\tau_0$, $\tau_{1,m}$, $\tau_{2,m}$ that minimize the criterion $C_A$ to be estimated without requiring to do so a linear numerical relationship, such as relationship (3), that allows an estimate of these coefficients $T_0$, $T_{1,m}$, $\tau_{2,m}$ to be directly obtained from the values of the terms $\beta_j$.

The above embodiment was described in the particular case where the function $\tau(\theta)$ is decomposed in a Fourier basis of $\pi$-periodic functions. However, the method described above also works if the function $\tau(\theta)$ is decomposed in any other basis of $\pi$-periodic functions $f_m$ in which each function $f_m$ is defined in the interval $[0; 2\pi]$. In particular, it is not necessary for the basis of the $\pi$-periodic functions $f_m$ to be an orthogonal basis. Thus, in the basis of the $f_m$ functions, the function $\tau(\theta)$ is defined by the following relationship:

$$\tau(\theta) = \sum_{m=0}^{M} \tau_m f_m(\theta)$$

where the $\tau_m$ are the scalar coefficients of the function $\tau(\theta)$. For example, as a variant, the functions $f_m$ are piecewise constant $\pi$-periodic functions in $[0; \pi]$. A piecewise constant function is a function that takes constant values in a plurality of immediately successive sub-intervals comprised between $[0; \pi]$.

The method for minimizing the criterion C or the criterion $C_A$ by means of known algorithms for minimizing such a criterion may be implemented whatever the form of the adopted function $f_m$.

As a variant, the number M may be higher than or equal to the number $n_j$.

Variants of the Calculation of the Index A:

As a variant, the index A is calculated only for angles $\theta$ equal to the angles $\alpha_j$ and not for all the values of $\theta$ comprised between 0 and $\pi$. In this case, for example, the index A is only dependent on the sum of the following deviations:

$$\sum_{j=1}^{n_j} |\tau(\alpha_j) - M_\tau|^{no}$$

The classification may be carried out differently in step 42. For example, the order of classification of the images may be chosen differently.

The invention claimed is:

1. A method comprising, for each of a plurality of digital images, characterizing the anisotropy of the texture of the digital image, wherein characterizing the anisotropy of the texture of the digital image comprises: a) acquiring the digital image, the digital image formed from pixels, each pixel associated with a light intensity and with a position in space $\mathbb{Z}^d$, where d is a natural integer greater than or equal to two; b) automatically converting the acquired image in order to obtain a converted image Ij,k, the conversion comprising applying a modification Tj,k of the image that makes each pixel of the acquired image rotate from one position to the next by an angle $\alpha j$ about a point or an axis and that enlarges or shrinks the image by a factor $\gamma k$, where $\alpha j = \arg(ujk)$ and $\gamma k = |ujk|^2$, ujk is a vector that completely characterizes the modification Tj,k, the indices j and k uniquely identifying the angle $\alpha j$ and the factor $\gamma k$, respectively, then, for each converted image, calculating a K-increment Vj,k[m] for each pixel of position m of the converted image, this K-increment is calculated by applying a convolution kernel v by means of the following formula:

$$V_{j,k}[m] = \sum_{p \in [0,L]^d} v[p] \cdot Z[m - T_{j,k} \cdot p]$$

where: the product Tj,k·p corresponds to the application of the modification Tj,k to the pixel that initially had the position p in the image I; the convolution kernel v performs linear filtering and possesses a characteristic polynomial Qv(z) and a finite support $[0,L]^d$, v[p] is the value of the convolution kernel v for the position p, the characteristic polynomial Qv(z) is defined by the following formula:

$$\forall z \in \mathbb{R}^d, Q_v(z) = \sum_{p \in [0,L]^d} v[p] z^p$$

and meeting the following condition:
$\forall \alpha \in [0,K]^d$ such that $|\alpha| \leq K$ then $$\frac{\partial^{|\alpha|} Q_v}{\partial z_1^{a_1} \ldots \partial z_d^{a_d}}(1, \ldots, 1) = 0$$

where: L is an acquired vector of $[0, N]^d$ that parametrizes the kernel v, N is a vector belonging to $\mathbb{N}^d$ that codes the size of the image and the components of which are strictly positive natural integers; the constant K is a nonzero acquired natural integer; z is a vector of components $z1, z2, \ldots, zd$; $z^p$ designates the monomial $$z1^{p1*} z_i^{p2*} \ldots {}^*zd^{pd};$$

$\partial^{|\alpha|} Qv / \partial z1^{a1} \ldots \partial z^{ad}$ is the partial derivative of the polynomial Qv(z) with respect to the components of the vector z, the symbol $\partial z^{ai}$ indicating a differentiation of the polynomial Qv(z) of order ai with respect to the variable zi, where zi is the i-th component of the vector z and ai is the i-th component of the vector a, i is an integer index higher than or equal to 0 and lower than or equal to d; the step b) is executed with nj different angles $\alpha j$ and, for each angle $\alpha j$, with at least two different factors $\gamma k$, nj is an integer higher than or equal to 2 so as to obtain at least four different converted images Ij,k;

c) for each different converted image Ij,k, calculating a p-variation Wj,k of this converted image from said calculated K-increments; d) estimating the terms βj of the following statistical regression:

log(|Wj,k|)=log(|ujk|$^2$)*H+βj+εj,k, where: H is the Hurst exponent of the acquired image; εj,k is an error term of the regression the statistical properties of which are predetermined; wherein the method further comprises: e) estimating the scalar coefficients τm of an even function τ(θ) defined in [0; 2π] that minimizes the following $$C = \sum_{j=1}^{n_j} (\beta_j - \tau * \Gamma(\alpha_j))^2$$

criterion C:
where: βj are the terms estimated in step d), τ(θ) is the function defined by the following relationship for any angle θ belonging to [0; 2π]:

$$\tau(\theta) = \sum_{m=0}^{M} \tau_m f_m(\theta)$$

where: M is a constant integer number higher than an acquired datum, τm are the scalar coefficients of the function τ(θ), fm(θ) are the functions of a basis of π-periodic functions defined in the interval [0; 2π], Γ(θ) is the function defined by the following relationship:

$$\Gamma(\theta) = \int_{\mathbb{R}+} |\hat{v}(\rho\theta)|^2 \rho^{-2H-1} d\rho$$

where: $\hat{v}$ is the discrete Fourier transform of the kernel v, H is the Hurst exponent of the acquired image, ρ is the variable of integration, the symbol "*" designates the circular convolution of the functions τ(θ) and Γ(θ), f) then, calculating, depending on the estimate of the scalar coefficients τm, an anisotropy index that characterizes the anisotropy of the image, this index varying monotonically as a function of the statistical dispersion of the values of the function τ(θ) for θ varying between 0 and π, said method further comprising classifying said acquired digital images based at least in part on said anisotropy index.

2. The method as claimed in claim 1, wherein the kernel v used in step b) is equal to the convolution of any convolution kernel and the kernel defined in the following way:

$$v[p] = (-1)^{|p|} \times C_{L_1}^{p_1} \times \ldots \times C_{L_d}^{p_d} = (-1)^{|p|} \times \prod_{i=1}^{d} \frac{L_i!}{p_i! \times (L_i - p_i)!}$$

if the vector p belongs to [0,L]$^d$ and v[p]=0 if not, where the terms C$^P$L are binomial coefficients, the constant K then is equal to K=|L|−1.

3. The method as claimed in claim 2, wherein: the functions fm are functions of the Fourier basis and the function τ(θ) is defined by the following relationship:

$$\tau(\theta) = \tau_0 + \sum_{m=1}^{M} (\tau_{1,m}\cos(2m\theta) + \tau_{2,m}\sin(2m\theta))$$

where τ0, τ1,m and τ2,m are the scalar coefficients of the function τ(θ), the kernel v is defined by the following relationship:

$$v[p] = (-1)^{p_1} \frac{L_1!}{p_1!(L_1 - p_1)!}$$

in step e), the estimate of these coefficients is calculated using the following relationship:

$$\tau^* = (L^\tau L + \lambda R)^{-1} L^\tau \beta$$

where:
τ* is the vector (τ0*, τ1,1*, τ2,1*, τ1,2*, τ2,2*, ..., τ1,M-1*, τ2,M-1*, τ1,M*, τ2,M*)$^\tau$, the coefficients τ0*, τ1,1*, τ2,1*, τ1,2*, τ2,2*, ..., τ1,M-1*, τ2,M-1*, τ1,M*, τ2,M* is the estimates of the coefficients τ0, τ1,1, τ2,1, τ1,2, τ2,2, ..., τ1,M-1, τ2,M-1, τ1,M, τ2,M, respectively, L is the matrix of nj×(2M+1) size the k-th column of which is defined by ($\hat{\mu}$[0],$\hat{\mu}$[1]cos($\alpha_k$),$\hat{\mu}$[1]sin($\alpha_k$), ... ,$\hat{\mu}$[M]cos(M$\alpha_k$),$\hat{\mu}$[M]sin(M$\alpha_k$))

the following relationship:
where $\hat{\mu}$[0],$\hat{\mu}$[1], ... ,$\hat{\mu}$[M] are the coefficients of the discrete Fourier transform of the function μ(θ) given by: μ(θ)=| cos(θ)$^{2H}$, where H is the Hurst exponent of the acquired image,
λ is a predetermined parameter, R is a diagonal matrix of (2M+1)×(2M+1) size the coefficients of which on the diagonal are, in order: 0, 2, 2, 5, 5, . . . , (1+M$^2$), (1+M$^2$), the symbol "τ" designates the transpose operation, β is the vector (β1, β2, . . . , βnj−1, βnj)$^\tau$.

4. The method as claimed in claim 3, wherein the method comprises: calculating a value λ* defined by the following relationship:

$$\lambda^* = \frac{\kappa}{(1+M^2)} \frac{\text{trace}(V(\beta))}{|\beta|^2}$$

wherein κ is equal to v$_+$/v$_-$, v$_+$ and v$_-$ is the highest and the lowest eigenvalue of the matrix L$^\tau$L, respectively trace (X) is the function that returns the sum of the diagonal coefficients of a square matrix X, V(β) is the covariance matrix of the vector β, |β|$^2$ is the Euclidean norm to the power of two of the vector β, and
automatically choosing the parameter λ in the interval [0; 1.3λ*].

5. The method as claimed in claim 1, wherein the anisotropy index is calculated from the sum of the following deviations:

$$\sum_{i=1}^{n_j} |\tau(\alpha_j) - M_\tau|_{Lp}$$

wherein M$_\tau$ is an estimate of an average value of the function τ(θ) for θ varying between 0 and π, | . . . |Lp is the norm L1 if Lp is equal to 1, the norm L2 if Lp is equal to 2 and so on, Lp is strictly higher than zero.

6. The method as claimed in claim 5, wherein the anisotropy index A is calculated using the following relationship:

$$A = \sqrt{\sum_{m=1}^{M} (\tau_{1,m}^{*2} + \tau_{2,m}^{*2})}$$

7. The method as claimed in claim 1, wherein: the vector ujk is a vector of $\mathbb{Z}^2 \setminus \{(0,0)\}$, the modification Tj,k has: for d=2, the following matrix form:

$$T_{j,k} = \mathbf{y}_k \begin{bmatrix} \cos(\alpha_j) & -\sin(\alpha_j) \\ \sin(\alpha_j) & \cos(\alpha_j) \end{bmatrix}$$

and, for d=3, one of the following matrix forms or a combination of these matrix forms:

$$T_{j,k} = \mathbf{y}_k \begin{bmatrix} \cos(\alpha_j) & -\sin(\alpha_j) & 0 \\ \sin(\alpha_j) & \cos(\alpha_j) & 0 \\ 0 & 0 & y_k \end{bmatrix}$$

$$T_{j,k} = \mathbf{y}_k \begin{bmatrix} \cos(\alpha_j) & 0 & -\sin(\alpha_j) \\ 0 & y_k & 0 \\ \sin(\alpha_j) & 0 & \cos(\alpha_j) \end{bmatrix}$$

$$T_{j,k} = \mathbf{y}_k \begin{bmatrix} y_k & 0 & 0 \\ 0 & \cos(\alpha_j) & -\sin(\alpha_j) \\ 0 & \sin(\alpha_j) & \cos(\alpha_j) \end{bmatrix}$$

the converted image is obtained by multiplying the coordinates of the position of each pixel by the matrix Tj,k, and the K-increments are calculated using only those pixels of the image that occupy a position m belonging to a set E, this set E containing only those positions m that already exist in the image I and that, whatever the modification Tj,k, after application of this modification Tj,k, occupy a position that also already exists in the image I, and for which the position "m−Tj,k·p" occupies a position that also already exists in the image I; the converted image Ij,k obtained at the end of the calculation of this K-increment only containing pixels the positions of which belonged to the set E.

8. The method as claimed in claim 7, wherein the p-variations calculated in step c) are quadratic variations calculated using the following formula:

$$W_{j,k}[m] = \frac{1}{n_E} \sum_{m \in E} (V_{j,k}[m])^q$$

where q=2 and nE is the number of positions that belong to the set E.

9. A method for automatically classifying digital images depending on the anisotropy of their texture, this method comprising acquiring a plurality of images each formed from a plurality of pixels; wherein the method further comprises automatically calculating, for each of the acquired images, a respective anisotropy index by means of a method as claimed in claim 1, and classifying the acquired digital images using an automatic classifier, depending on the anisotropy index calculated for each of said images.

10. A non-transitory computer-readable data storage medium having encoded thereon instructions for performing a method as claimed in claim 1, when these instructions are executed by a computer.

11. A computer for implementing claim 1, said computer programmed to, for each of a plurality of digital images, a process for characterizing the anisotropy of the digital image, wherein the process comprises:

a) acquiring the digital image, the digital image is formed from pixels, each pixel is associated with a light intensity and with a position in space $\mathbb{Z}^d$, where d is a natural integer higher than or equal to two; b) automatically converting the acquired image in order to obtain a converted image Ij,k, the conversion comprising applying a modification Tj,k of the image that makes each pixel of the acquired image rotate from one position to the next by an angle αj about a point or an axis and that enlarges or shrinks the image by a factor γk, where αj=arg(ujk) and γk=|ujk|², ujk is a vector that completely characterizes the modification Tj,k, the indices j and k uniquely identifying the angle αj and the factor γk, respectively, then, for each converted image, calculating a K-increment Vj,k[m] for each pixel of position m of the converted image, this K-increment is calculated by applying a convolution kernel v by means of the following formula:

$$V_{j,k}[m] = \sum_{p \in [0,L]^d} v[p] \cdot Z[m - T_{j,k} \cdot p]$$

wherein the product Tj,k·p corresponds to the application of the modification Tj,k to the pixel that initially had the position p in the image I; the convolution kernel v performs linear filtering and possesses a characteristic polynomial Qv(z) and a finite support $[0,L]^d$, v[p] is the value of the convolution kernel v for the position p, the characteristic polynomial Qv(z) is defined by the following formula:

$$\forall z \in \mathbb{R}^d, Q_v(z) = \sum_{p \in [0,L]^d} v[p] z^p$$

and meeting the following condition:
$\forall \alpha \in [0,K]^d$ such that $|\alpha| \leq K$ then $$\frac{\partial^{|\alpha|} Q_v}{\partial z_1^{a_1} \ldots \partial z_d^{a_d}}(1, \ldots, 1) = 0$$

wherein
L is an acquired vector of $[0, N]^d$ that parametrizes the kernel v, N is a vector belonging to $\mathbb{N}^d$ that codes the size of the image and the components of which are strictly positive natural integers; the constant K is a nonzero acquired natural integer; z is a vector of components z1, z2, ..., zd; $z^p$ designates the monomial $z1^{p_1} * z2^{p_2} * \ldots * zd^{p_d}$;
$\partial^{|\alpha|} Qv/\partial z1^{a_1} \ldots \partial zd^{a_d}$ is the partial derivative of the polynomial Qv(z) with respect to the components of the vector z, the symbol $\partial z1^{ai}$ indicating a differentiation of the polynomial Qv(z) of order ai with respect to the variable zi, where zi is the i-th component of the vector z and ai is the i-th component of the vector a, i is an integer index higher than or equal to 0 and lower than or equal to d; the step b) is executed with nj different angles αj and, for each angle αj, with at least two different factors γk, nj is an integer higher than or equal to 2 so as to obtain at least four different converted images Ij,k;

c) for each different converted image Ij,k, calculating a p-variation Wj,k of this converted image from said calculated K-increments; d) estimating the terms βj of the following statistical regression: log(|Wj,k|)=log(|ujk|²)*H+βj εj,k, wherein H is the Hurst exponent of the acquired image; εj,k is an error term of the regression the statistical properties of which are predetermined; wherein the computer is also programmed to execute the following steps: e) estimating the scalar coefficients τm of an even function τ(θ) defined in [0; 2π] that minimizes the following criterion C:

$$C = \sum_{j=1}^{n_j} (\beta_j - \tau * \Gamma(\alpha_j))^2$$

wherein βj are the terms estimated in step d), τ(θ) is the function defined by the following relationship for any angle θ belonging to [0; 2π]:

$$\tau(\theta) = \sum_{m=0}^{M} \tau_m f_m(\theta)$$

wherein M is a constant integer number higher than an acquired datum, τm are the scalar coefficients of the function τ(θ), fm(θ) are the functions of a basis of π-periodic functions defined in the interval [0; 2π], Γ(θ) is the function defined by the following relationship:

$$\Gamma(\theta) = \int_{\mathbb{R}+} |\hat{v}(\rho\theta)|^2 \rho^{-2H-1} d\rho$$

wherein $\hat{v}$ is the discrete Fourier transform of the kernel v,
H is the Hurst exponent of the acquired image, ρ is the variable of integration, the symbol "*" designates the circular convolution of the functions τ(θ) and Γ(θ), f) then, calculating, depending on the estimate of the scalar coefficients τM, an anisotropy index that characterizes the anisotropy of the image, this index varying monotonically as a function of the statistical dispersion of the values of the function τ(θ) for θ varying between 0 and π, said method further comprising classifying said acquired digital images based at least in part on said anistropy.

* * * * *